Sept. 19, 1939.  M. T. MAYES, 2D  2,173,590
COMPUTING MECHANISM WITH BARGAIN SALE CONTROL
FOR LIQUID DISPENSING APPARATUS
Filed Feb. 4, 1937   5 Sheets—Sheet 1

INVENTOR
*Matthew T. Mayes, 2nd*
BY
*Chapin + Neal*
ATTORNEYS

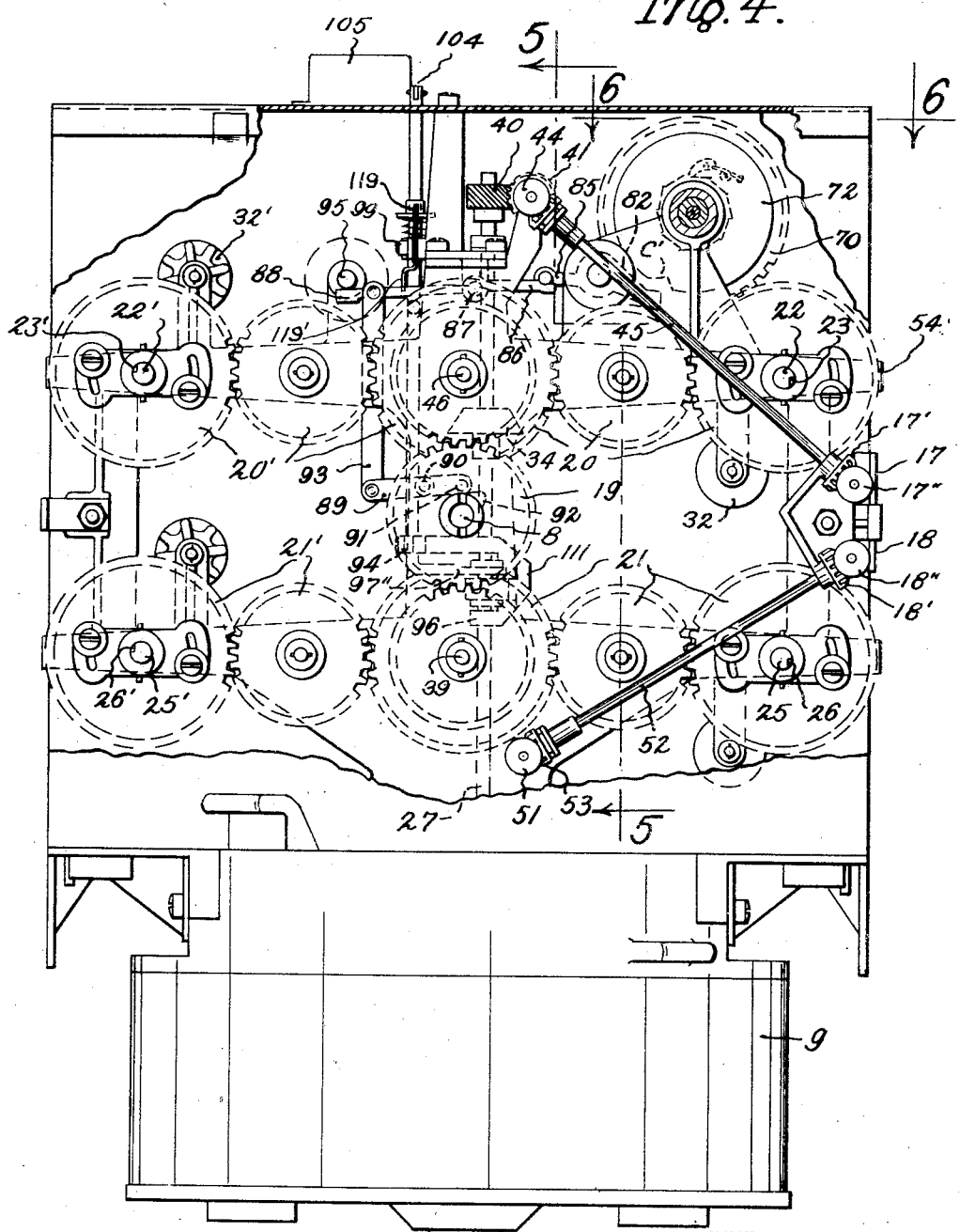

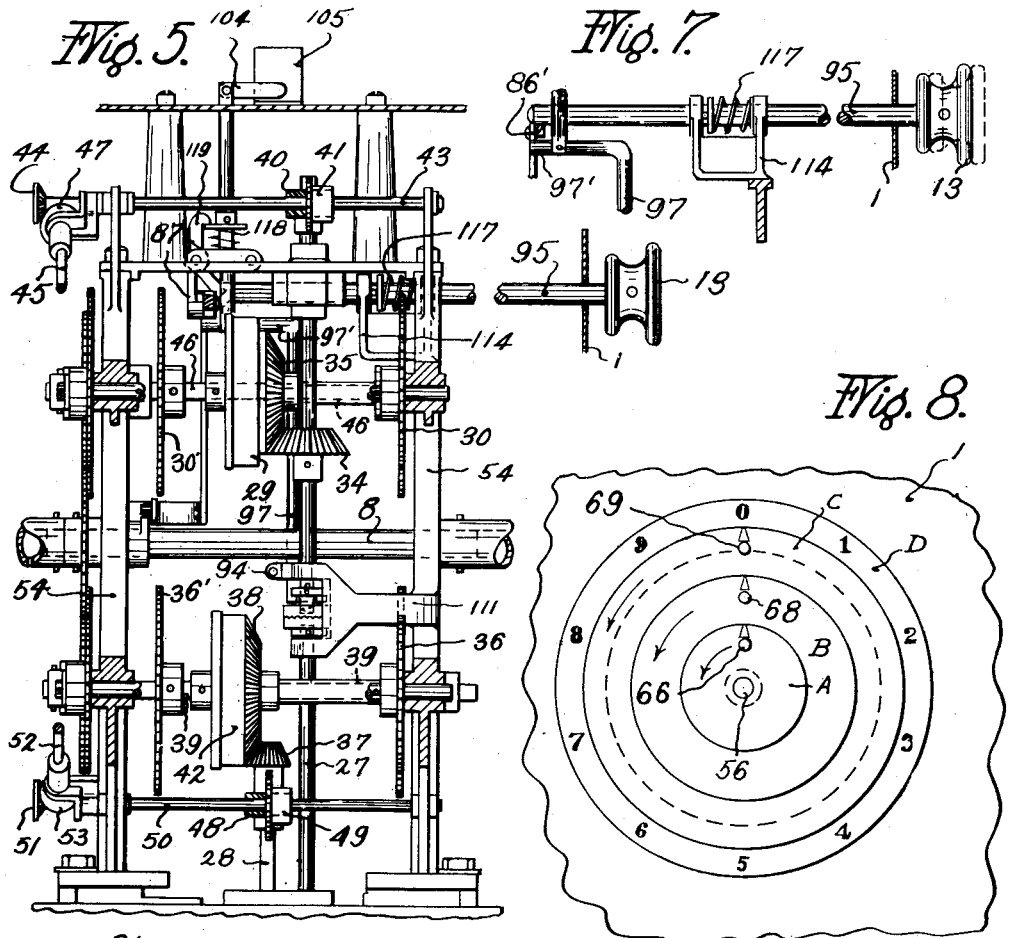
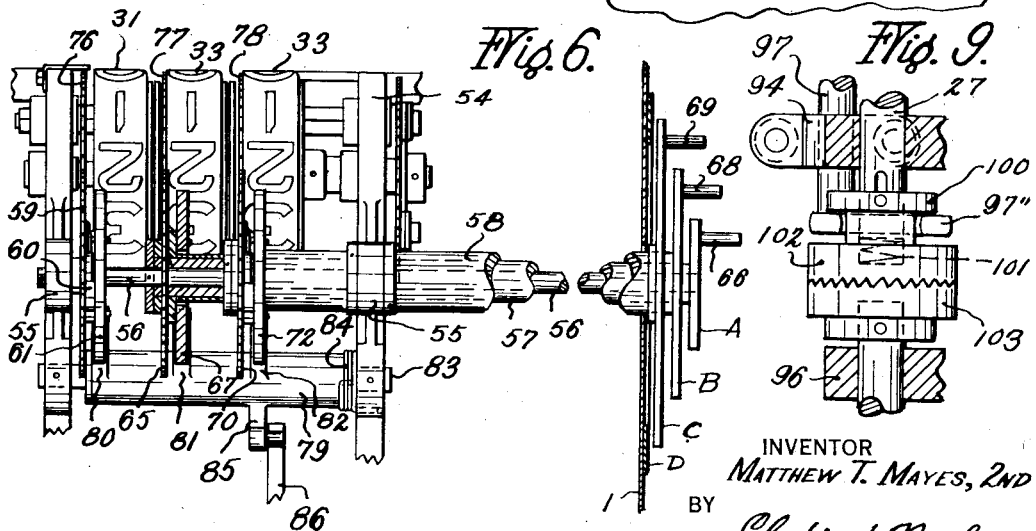

Sept. 19, 1939.    M. T. MAYES, 2D    2,173,590
COMPUTING MECHANISM WITH BARGAIN SALE CONTROL
FOR LIQUID DISPENSING APPARATUS
Filed Feb. 4, 1937    5 Sheets-Sheet 4

INVENTOR
*Matthew T. Mayes, 2nd*
BY
*Chapin + Neal*
ATTORNEYS

Sept. 19, 1939. M. T. MAYES, 2D 2,173,590
COMPUTING MECHANISM WITH BARGAIN SALE CONTROL
FOR LIQUID DISPENSING APPARATUS
Filed Feb. 4, 1937 5 Sheets—Sheet 5

INVENTOR
MATTHEW T. MAYES, 2ND
Chapin + Neal
ATTORNEYS

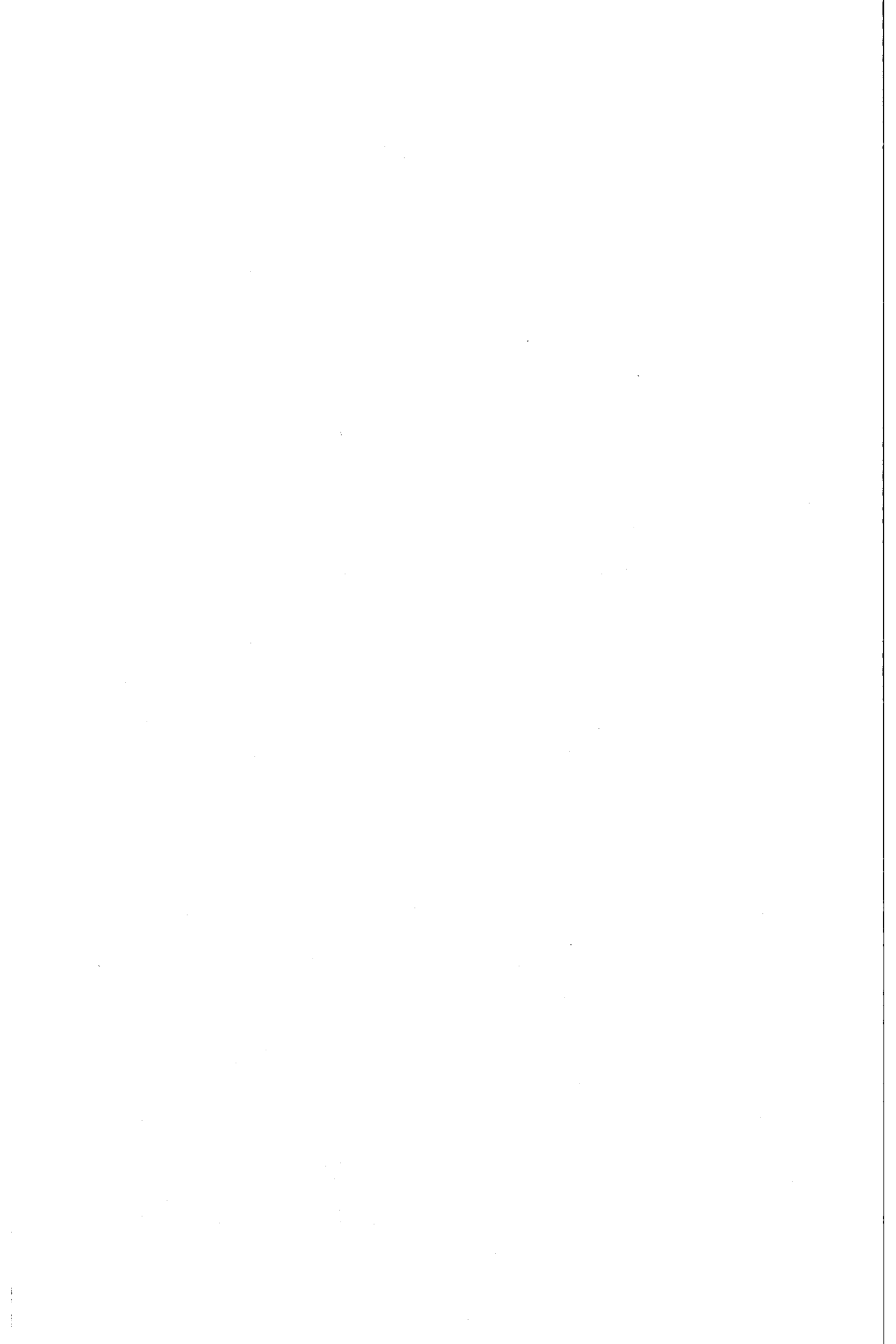

Patented Sept. 19, 1939

2,173,590

UNITED STATES PATENT OFFICE 2,173,590

COMPUTING MECHANISM WITH BARGAIN SALE CONTROL FOR LIQUID DISPENSING APPARATUS

Matthew T. Mayes, 2nd, Springfield, Mass., assignor to Gilbert & Barker Manufacturing Company, West Springfield, Mass., a corporation of Massachusetts Application February 4, 1937, Serial No. 124,072

1 Claim. (Cl. 235—132)

This invention relates to improvements in liquid dispensing apparatus and more particularly to apparatus of the so-called computing meter pump type, now commonly used for dispensing measured quantities of gasoline and the like.

These pumps are provided with meters which measure the volume of liquid dispensed. The meter has a register with two indicating means, one of which indicates the quantity of liquid dispensed in gallons; and the other of which indicates the cost of such quantity in dollars and cents. Preferably also, the meter has a third indicating means for displaying the unit price or posted price per gallon at which the cost is computed. The third indicating means is manually adjustable to change the unit price as required from time to time, and such means is interlocked with the cost indicating means so as to compel a proportionate change in the relationship between the cost and quantity indicating means. The register is also provided with suitable resetting means for returning the cost and quantity indicating means to zero after the completion of each sale. In addition to the individual sales indicators above mentioned there is also provided means for totalizing all money received and gasoline dispensed, in the form of separate registers, one a cost or money totalizer, and the other a quantity or gallon totalizer.

The proprietors of gasoline stations in which such pumps are used frequently find it desirable to give what is known as bargain sales usually in the form of a stated quantity of gasoline for a fixed price. For example, if the regular posted price per gallon is 16¢, the station owner will advertise a sale of seven gallons for $1.05, thus offering a saving of 7¢ to customers for that quantity or multiples thereof. However, no bargain is offered on amounts less than the stated quantity. Consequently the pump owner does not wish to disturb the posted price adjustment of his computer, viz. the relation between the unit price indicator, and the cost and quantity indicators, because for all sales in less than bargain lots he wishes the pump computer to show the quantity and cost at the regular posted price.

The present invention has for its object more particularly the provision of means to enable the pump proprietor to use his pump advantageously for bargain sales without disturbing its use for regular sales.

To this end there is provided a predetermining or preset mechanism for the cost indicator together with a manual control therefor arranged in combination with the computing mechanism so that when the attendant wishes to use the pump for a bargain sale (for instance seven gallons for $1.05, when the regular posted price is 16¢ per gallon), he may set the predeterminer at the cost figures of the bargain sale, viz. $1.05, operate the manual control to render the bargain sale mechanism operative, and proceed to operate the pump in the usual manner for dispensing gasoline to the customer. Thereupon the computing mechanism of the pump will operate in the regular way to progressively display on the quantity indicator the number of gallons and fractions thereof being dispensed, and also to progressively display on the cost indicator the total value in dollars and cents of said dispensed gas in accordance with the regular posted price, viz. 16¢ per gallon. This operation of the computer will continue until the cost indicator reaches the bargain price for seven gallons whereupon said cost indicator will stop and continue to display said price of $1.05 while the quantity indicator will continue in operation during the dispensing of the gasoline until the bargain quantity thereof is reached, viz. seven gallons, whereupon the attendant will stop the pump in the usual way. There will thus be displayed to the customer both the proper quantity of gas purchased and the proper bargain price therefor.

An advantageous feature of this arrangement is that with the computer set for a bargain price sale as above described, if the customer decides to take less gallonage than the fixed bargain quantity and orders the attendant to stop the pump before said bargain quantity, viz. seven gallons, is reached, the computer will display on the cost indicator the value of said less than bargain quantity at the regular posted price, viz. 16¢ per gallon. Thereupon the customer can be charged the regular posted price for any quantity less than the bargain quantity, and will get the advantage of the bargain price only when he takes the bargain quantity and multiples thereof.

A further feature of the invention is that the reset mechanism for the computer is arranged so that upon each resetting operation of the computer back to zero, the bargain sale function of the apparatus is rendered inoperative and is only rendered operative again by actuation of the manual control therefor. In other words, after one bargain sale and a reset of the indicators to zero, the computer will thereafter operate in the regular way without showing a bargain sale until such time as the attendant wishes to make a bargain sale and operates the manual control. However, when the bargain sale predeterminer is once set for a particular sale, viz. $1.05, it will repeat this bargain sale whenever operated until its setting is changed to a different bargain sale.

A still further feature of the invention is the provision of means for registering on a counter the total number of bargain sale operations that are made with the pump. This bargain sale counter registers a bargain sale operation only when it is actually made, as distinguished from registering the number of times that the pump may be set for a bargain sale because it often happens that the pump may be set for a bargain sale and the customer may not be able to take the full stated quantity which entitles him to a bargain sale. In such a case a bargain sale is not actually made and no registration thereof is made on the bargain sales counter.

Further advantages and features of the invention will become apparent from the following more detailed description of a preferred embodiment thereof taken in connection with the accompanying drawings, in which Fig. 1 is a front elevational view of the complete pump having the present invention incorporated therein;

Fig. 4 is a left side elevational view of the principal mechanism within the computer head;

Fig. 5 is a sectional view along line 5—5 of Fig. 4, looking in the direction of the arrow;

Fig. 6 is a view partly in section and partly in plan, slightly enlarged, along line 6—6 of Fig. 4, looking in the direction of the arrow;

Fig. 7 is a detail of the bargain sales control plunger;

Fig. 8 is a detail front view of the bargain sales price setting dials;

Fig. 9 is a fragmentary detail of the throw-out clutch in the drive shaft of the cost indicator;

Figures 10, 17, 18:
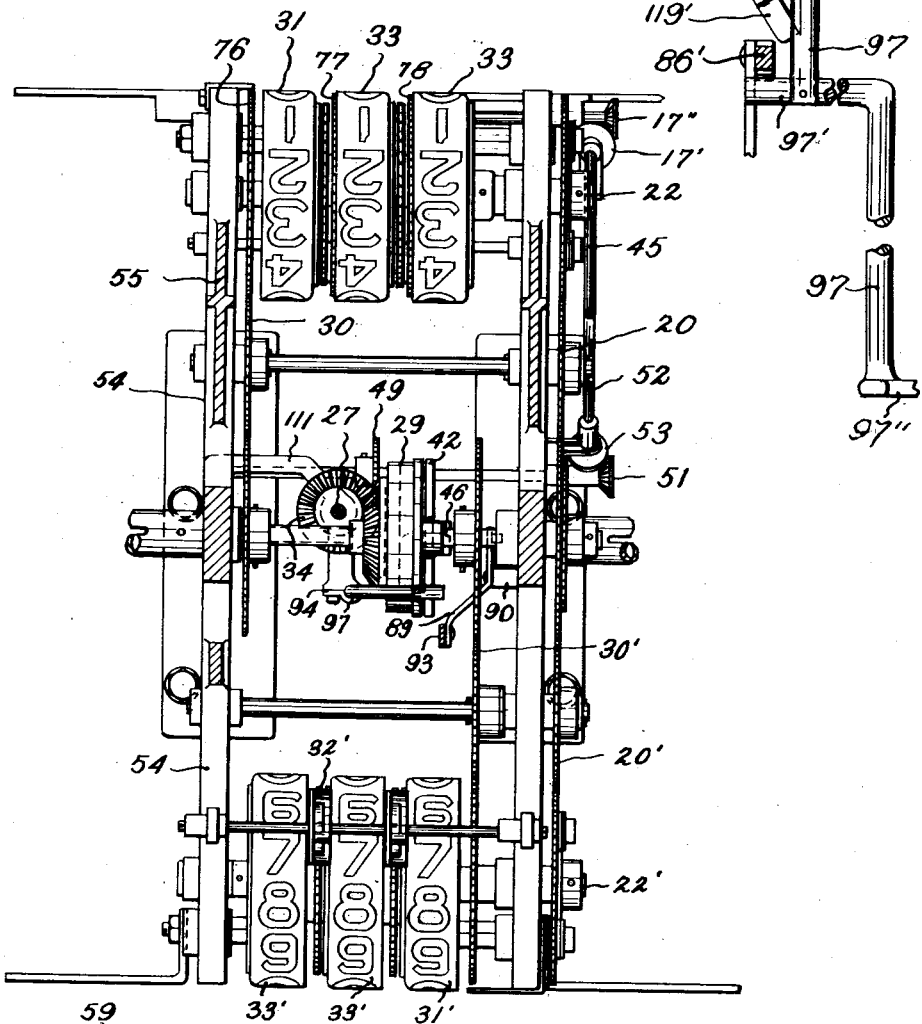
Fig. 10 is a top plan view of the computer head with the predeterminer mechanism removed.
Figure 11:
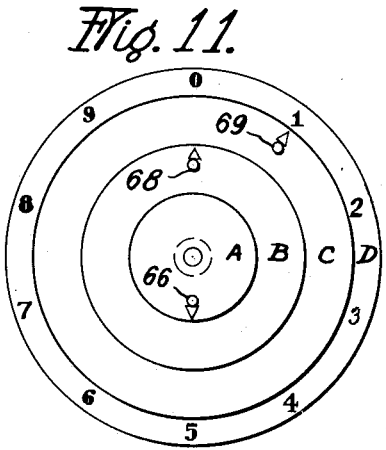
Figure 12:
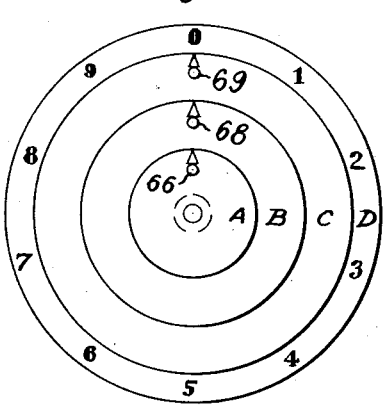
Figure 13:
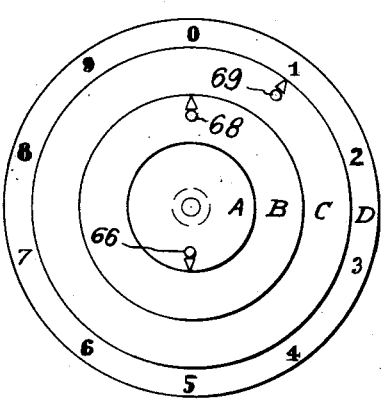
Figure 14:
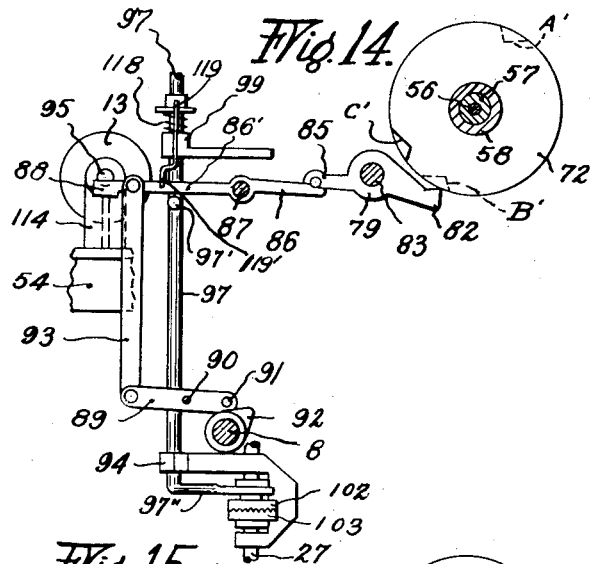
Figure 15:
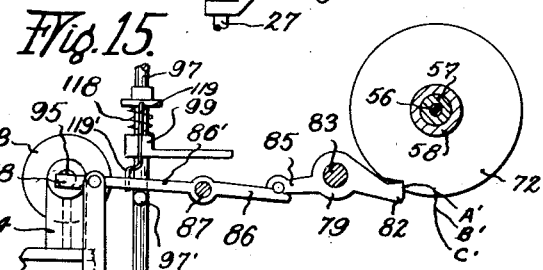
Figure 16:
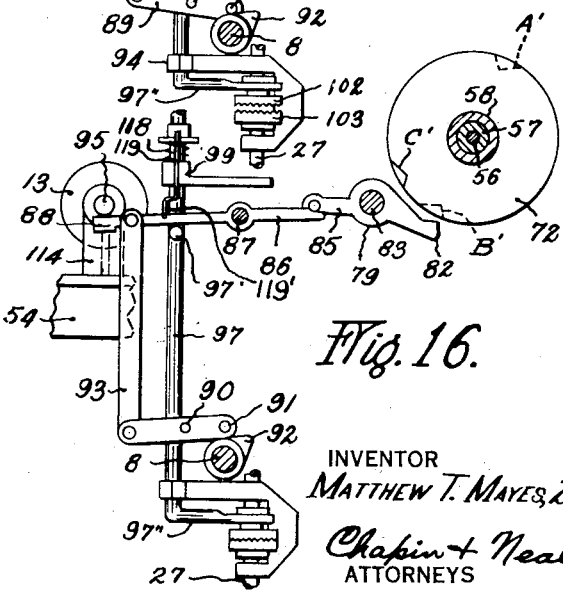

Figs. 11, 12, and 13 are views of the bargain price setting dials at different settings;

Figs. 14, 15, and 16 are details of the predeterminer control mechanism showing the positions thereof corresponding to the dial settings in Figs. 11, 12, and 13;

Fig. 17 is a detail showing the construction of a predeterminer disk and its driving gear; and Fig. 18 is a detail view of the holding latch for the clutch throw out spring.

Figure 1:
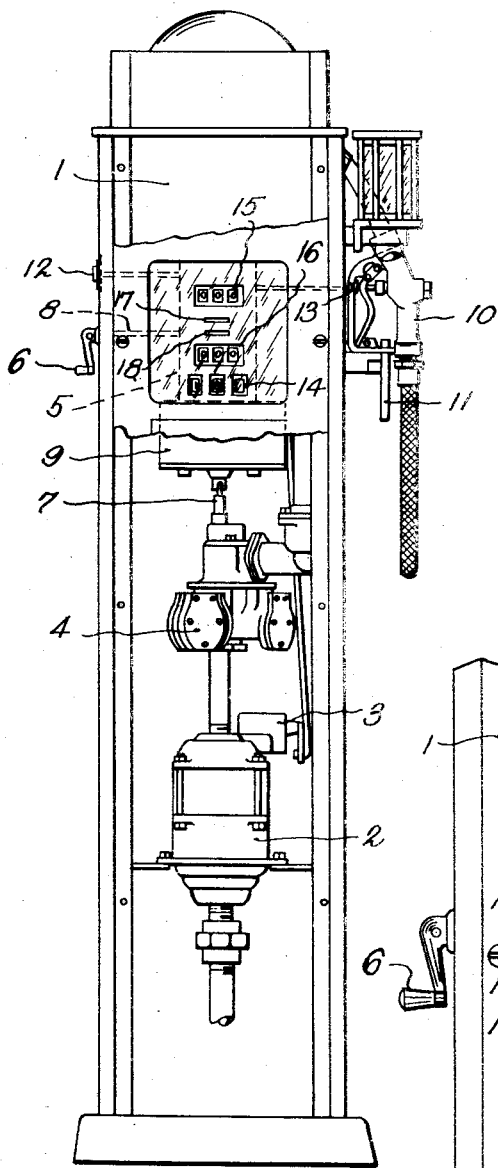
Figure 2:
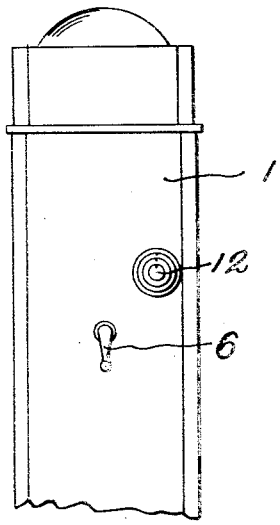
Fig. 2 is a view at the left upper side of the pump casing.

The dispensing pump and its appurtenances illustrated as a whole in Fig. 1 comprise the pump casing 1, combined motor and pumping unit 2, motor switch 3, flow operated meter 4, and computer head indicated generally at 5. The computing mechanism is provided with a suitable reset mechanism for returning the indicators to zero position, the shaft of said reset mechanism being indicated at 8, operated from the crank 6.

It will be understood that the computer mechanism is arranged to display its indicators both at the front and the back of the pump, and as shown in Fig. 1 the front of the pump has a sight opening at 15 for the cost indicator figures in dollars and cents, and a sight opening at 16 for the quantity indicator figures in gallons. At the sight openings 14 are displayed the unit price figures or posted price per gallon at which the computer is adjusted to operate.

The computer mechanism is driven from the meter 4 through the shaft 7 and suitable change gear mechanism (not shown) within gear box 9. It will be understood that each adjustment or setting of the unit price figures at 14 serves to effect the proper change in gear ratio between the drives for the quantity indicator at 16 and the cost indicator at 15 so that the latter will display the proper cost figures for any quantity of gasoline at the price per gallon set by the unit indicator at 14. Behind the sight opening 17 is mounted a cost totalizer which registers the sum total of sucessive money indications on the cost indicator 15, and at the opening 18 is a quantity totalizer for registering the total quantity of gallons sucessively registered by the quantity indicator at 16.

Figure 3:
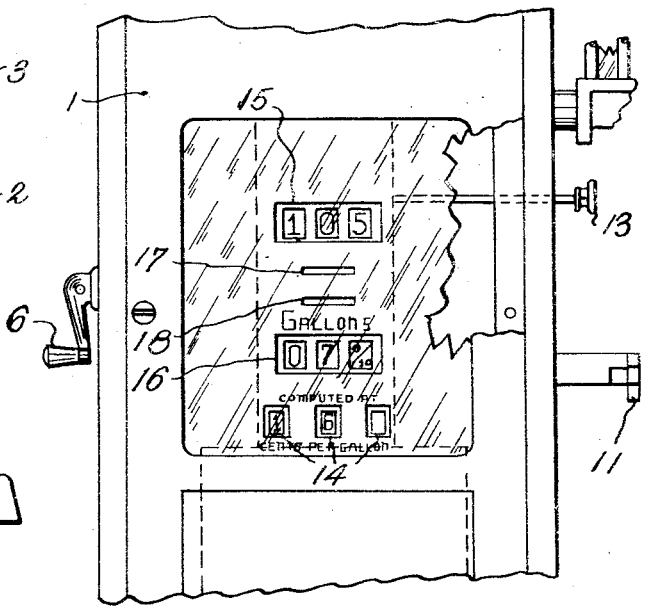
Fig. 3 is a fragmentary view of the pump casing showing the computer dial face, and the bargain sales control plunger.

The pump draws the gasoline from a suitable supply not shown and forces it through the meter 4 to the usual discharge nozzle at 10. 11 is the manual control handle for the motor switch at 3 and has suitable connections thereto in accordance with common practice. At 12 on the left side of the pump is located bargain price setting dials, and on the right side of the pump as shown in Figs. 1 and 3 is accessible to the operator the knob 13 of a manual control plunger for the bargain sale mechanism.

Referring to Figs. 4, 5, and 10, that part of the computing mechanism necessary for understanding the present invention will now be described. As previously stated, the computer has duplicate indicators at opposite sides of the pump, front and back.

The dial wheels for the cost indicators at front and back show clearly in Fig. 10; 31 being the units wheel, and 33 being the tens and hundreds wheels at the front, 31' being the units wheel, and 33' being the tens and hundreds wheels at the back. The front dial wheels 31, 33 are mounted for free forward rotation on cross shaft 22, the latter being rotatably mounted in suitable bearings of the computer head frame 54. The back dial wheels 41', 33' are similarly mounted on a similar shaft 22'.

Unit dial wheel 31 has fixed thereto a gear 76 and is driven by a train of gears 30 from a cross shaft 46 located centrally of the frame 54. In a similar manner units dial 31' is driven from the cross shaft 46 by gear train 30'. The tens and hundreds dial wheels 33 are driven from the units wheel 31 in the manner usual with counters by means of the Geneva carry over gear 32. 32' is the carryover gear for the dial wheels 31'.

It will be observed that the front and back cost indicator dial wheels are operated synchronously from the common cross shaft 46. This shaft 46 in turn is driven from the vertical drive shaft 27 (see Fig. 5) through the bevel gears 34, 35 and one way clutch member 29, the latter being pinned to shaft 46 and containing within the same well known clutch mechanism coacting with bevel gear 35 loose on shaft 46, so as to be driven thereby only in a forward direction. The vertical drive shaft 27 has its lower end within the gear change box from which it is driven in adjusted gear ratio to the vertical drive shaft 28 of the quantity indicator in a manner and for the purpose well understood.

The quantity indicator dial wheels are located directly beneath the cost indicator wheels and are mounted for free forward rotation on the shaft 25 at the front and on shaft 25' at the back of the computer. It is not deemed necessary to show these quantity indicator dial wheels in further detail since they are operated in a similar manner to the cost indicator wheels except that they are driven from a lower cross shaft 39 through a gear train 36 for the front quantity indicator, and gear train 36' for the back quantity indicator (see Fig. 5). The cross shaft 39 is driven from the vertical shaft 28 through bevel gears 37, and 38, and one way clutch member 42, for a drive in a forward direction only as was described in connection with cross shaft 46.

From the upper end of the cost indicator drive shaft 27 a gear drive leads to the cost or money totalizer at 17 (see Figs. 4 and 5) comprising worm gears 40, 41, cross shaft 43, bevel gears 44, 47, inclined shaft 45 and bevel gears 17' and 17". Also from an upper portion of the quantity indicator drive shaft 28, there is a gear drive to the quantity or gallons totalizer at 18, comprising the worm gears 48, 49, cross shaft 50, bevel gears 51, 53, inclined shaft 52, and bevel gears 18' and 18".

The reset mechanism for returning all of the indicator dial wheels to zero (except the totalizers 17 and 18) after each dispensing operation is of conventional type, and comprises the manually operated shaft 8 with appropriate gearing connections so that one revolution of said shaft 8 by the crank 6 will cause a complete and simultaneous revolution of each of the shafts 22, 22', 25, and 25'. Notches 23, 23', 26 and 26' on these shafts coact with well known pick-up pawls within the several dial wheels to bring them all back to zero position when said shafts are rotated. As shown in Fig. 4, gear 19 is fixed to the reset shaft 8 and through gear train 20 operates the shaft 22, through gear train 20' operates the shaft 22', through gear train 21 operates the shaft 25, and through gear train 21' operates the shaft 25'.

The details of the computing mechanism heretofore described are of standard and well known construction, and it is believed that the operation of the same will be understood without further explanation. The features of improvement thereof for employing the same as a bargain sales computer will now be described. As shown in Figs. 5 and 9, the drive shaft 27 for the cost indicator is divided into two parts, an upper part and lower part connected through the medium of a throw-out clutch 102, 103 (shown in Fig. 9) so that the upper part may remain stationary while the lower part of said shaft rotates with a continued running of the meter. It will be noted that it is the upper part of said shaft 27 which drives the cost indicator and the cost totalizer so that when it is declutched from the lower part of the shaft, neither the cost indicator nor cost totalizer is operated. The means for engaging and disengaging the throw-out clutch for the shaft 27 will be better understood in connection with the operation of the predeterminer mechanism for the cost indicator which will now be described.

Referring to Figs. 4 and 6, a supporting bracket 55 extends upwardly from the frame 54 of the computer head and supports thereon a predeterminer mechanism in proximity to and in geared relation with the cost indicator dial wheels at the front of the computer. Supported in suitable bearings in spaced arms of the bracket 55 is a series of predeterminer disks 61, 67, and 72, each disk being fastened to an independent shaft of its own for rotation therewith, the shaft 56 being fastened to disk 61, shaft 57 telescoped on shaft 56 being fastened to disk 67, and shaft 58 telescoped on shaft 57, being fastened to disk 72. Disk 61 may be termed the units disk at it is adapted to be driven from the units dial wheel of the cost indicator. For similar reasons disk 67 may be termed the tens disk and disk 72 the hundreds disk.

The driving mechanism for each predeterminer disk is similar and may be clearly seen from the detailed illustration of the units disk in Fig. 17. As there shown, a ratchet 60 is fastened to shaft 56 so as to move with the disk 61. Mounted adjacent the ratchet 60 and loose on shaft 56 is a gear wheel 59 meshing with gear 76 fixed to the units dial wheel 31. A pawl 63 is carried on the gear 59 and is urged by its spring 64 into engagement with the ratchet 60. By this arrangement any forward rotation of the units dial wheel 31, either from the drive shaft 27 or from the resetting shaft 8 will rotate the units disk 61 through an angle of corresponding degree. It will be observed, however, that a forward rotation of the setting shaft 56 can move its units disk without disturbing the gear 59 or dial wheel 31 geared thereto.

In a similar manner each of the other predeterminer disks 67 for tens, and 72 for hundreds, is associated with its respective tens and hundreds dial wheel. 77 is the driving gear fixed to the tens dial wheel 33 and 78 is the driving gear fixed to the hundreds dial wheel 33. 65 is the pawl carrying gear associated with the tens disk 67 and 70 is the pawl carrying gear associated with the hundreds disk 72.

The outer end of the setting shaft 56 has fixed thereto a units setting dial A having thereon as shown in Fig. 8, an arrow and finger pin 66 for turning the same. Behind this dial A is a second setting dial B fixed to the tens shaft 57 and having thereon a finger pin and arrow 68, and behind the latter is a third setting dial C with finger pin and arrow 69 for the hundreds shaft 58. Surrounding the setting dials A, B, and C and attached to the frame or outside casing of the pump is a fixed dial face D having serial numbers thereon, zero to nine inclusive, as shown in Fig. 8, and each of the dials A, B, and C may be set by hand independently to bring its respective arrow to any one of the numbers on said fixed dial face D for a price indication of a bargain sale.

Each of the disks 61, 67 and 72 has formed on its peripheral surface a notch such as A', B', and C' shown in Figs. 14—16, and when each of the corresponding setting dials A, B, and C have their arrows pointing to zero on the fixed dial D all of said notches A', B' and C' are in registration with one another as shown in Figs. 12 and 15.

Mounted in the spaced arms of bracket 55 and adjacent the predeterminer disks is a fixed bearing rod 83 upon which is rockably mounted a detector sleeve 79. Projecting integrally from said sleeve are a series of detector fingers 80, 81, 82, adapted to engage in respective order the peripheral surfaces of each of the predeterminer disks 61, 67, and 72. A spring 84 (see Fig. 6) tends to rock the sleeve 79 and normally press the detector fingers against the disk surfaces. It will be appreciated that when all of the disk notches A', B', and C' are in registration corresponding to zero position for the disks, then all of the detector fingers may drop into their respective notches